Jan. 21, 1964 E. J. RAPOZA 3,118,582

TAPE CONTROL APPARATUS

Filed March 14, 1961 2 Sheets-Sheet 1

INVENTOR.
EDWARD J. RAPOZA
BY
Morris Rabkin
Attorney

Jan. 21, 1964 E. J. RAPOZA 3,118,582

TAPE CONTROL APPARATUS

Filed March 14, 1961 2 Sheets-Sheet 2

INVENTOR.
EDWARD J. RAPOZA

BY Morris A. Rabkin

ATTORNEY

United States Patent Office
3,118,582
Patented Jan. 21, 1964

3,118,582

TAPE CONTROL APPARATUS

Edward J. Rapoza, Westmont, N.J., assignor to Radio Corporation of America, a corporation of Delaware Filed Mar. 14, 1961, Ser. No. 95,693
5 Claims. (Cl. 226—95)

The present invention relates to apparatus for controlling the movement of a tape medium, and more particularly to a pneumatic tape drive system.

The invention is especially suitable for use in a magnetic tape transport wherein a magnettic tape record is driven along a path past a magnetic head. The invention is also generally applicable for feeding and controlling the movement of various other media. The term "tape," as used herein, is intended to designate any web member, strip, film or portion thereof, or object which is adapted to be fed or controlled in its movements in accordance with the features of the invention.

Magnetic tape is generally useful as an information storage medium in electronic computing systems. Equipment known in the computer art as a magnetic tape station often forms a part of a computer system. The speed of operation of a computing system may depend in part upon the speed of the tape station in storing information supplied from the computer and in providing information to the computer on command. Since different information is stored on different portions of a magnetic tape, the time required to obtain access to such information depends upon the prescribed operating speed of the tape and also upon the time required to accelerate the tape from rest to this prescribed operating speed. The tape is started, stopped and reversed frequently in the course of normal tape station operation. Accordingly, it is desirable to accelerate the tape from rest to a high operating speed (such, for example, as 250 inches per second) within a very short period of time, and also to facilitate rapid stopping of the tape.

Pneumatically operative tape driving devices have been proposed for use in tape stations. Some of these pneumatic tape driving devices utilize vacuum to draw the tape into engagement with a tape drive capstan. These systems have not been entirely satisfactory since they require a relatively long period of time to accelerate the tape to a high operating speed. Accordingly, the speed of data transfer into and out of tape stations utilizing such known pneumatic tape driving devices is not as rapid as would be desired.

It is also difficult to stop the tape rapidly in pneumatic tape driving devices utilizing vacuum since the tape tends to adhere to a moving vacuum tape driving member for a time after the command to stop the tape is given to the tape station.

It has been found that the acceleration of the tape by a pneumatic tape drive is limited to a large extent by the inertia and compressibility of the air. The acceleration of the tape is therefore related to the size of the volume which must be exhausted when a command to start the tape is given to the tape station. It is a feature of the present invention to provide a pneumatic tape drive device in which the size of the aforesaid volume is reduced.

An object of the present invention is to provide an improved system which is pneumatically operative for controlling the movement of a tape to selectively provide rapid tape acceleration and to facilitate rapid tape deceleration.

It is a further object of the present invention to provide an improved apparatus for controlling the movement of a tape by applying vacuum to draw the tape into driving relationship with a tape drive member in a very short period of time.

It is a still further object of the present invention to provide improved vacuum tape driving means wherein vacuum is selectively applied and removed from a tape drive surface and wherein, after removal of the vacuum, any remanent vacuum which might draw the tape into engagement with the drive surface is substantially eliminated.

It is a still further object of the present invention to provide an improved and simplified pneumatic system for driving a tape in opposite directions along a path having tape drive members which are separable from the tape by a hydrodynamically established film of air without an externally pressurized air supply which would otherwise add complexity and cost to the system.

It is a still further object of the present invention to provide an improved tape station having a pneumatic tape drive system which is operative to accelerate a tape storage member more rapidly than has been possible with known systems of this type.

It is a still further object of the invention to provide an improved vacuum tape drive capstan from which the tape is readily stripped for further tape handling.

Briefly described, apparatus for controlling the movement of a tape in accordance with the present invention includes a tape drive member having an apertured tape engaging surface. The tape drive member is disposed across an entrance ported to a vacuum supply. Suction may be supplied to the tape engaging surface through the apertures for drawing the tape into engagement with the surface. Control means, such as a valve plate is interposed between the entrance of the vacuum supply and the tape surface. The valve plate controls communication through the apertures of the tape drive member whereby suction can be selectively applied to the tape engaging surface. The volume of air in the space between the tape engaging surface and the valve plate is exceedingly small. The inertia of the air in this volume is correspondingly small and the time required for application of suction to the tape engaging surface is minute. Accordingly, the apparatus is very fast acting and provides the feature of accelerating the tape rapidly to required operating speed.

In accordance with another feature of the invention which substantially eliminates remanent suction at the tape engaging surface of a tape drive member, a small chamber may be formed between the tape engaging member and the valve plate. A vent to the atmosphere is provided which enters this small chamber through the valve plate. The valve plate alternatively opens the vent when vacuum to the tape engaging surface is cut off and seals the vent when vacuum is supplied to the tape engaging surface. Remanent vacuum at the tape engaging surface is rapidly dissipated through the vent when vacuum to the tape engaging surface is cut off.

In accordance with a still further feature of the invention, a pair of counter-rotating tape drive capstans may be provided. The tape passes over the tape engaging surfaces of the counter-rotating capstans, and a boundary layer of air is hydrodynamically developed between the tape and the surfaces of the capstans. This boundary layer of air separates the tape and the capstans. Each of the capstans includes means for selectively communicating the tape engaging surface thereof with a source of vacuum. The tape may be drawn into engagement with one of the capstans by suction, while the other capstan is separated from the tape by its hydrodynamic boundary layer of air and does not affect tape drive. When the tape is to be stopped, vacuum is cut off and both capstans are separated from the tape by boundary layers of air to facilitate tape braking.

The invention itself, both as to its organization and method of operation, as well as additional objects and advantages thereof, will become more readily apparent from a reading of the following description in connection with the accompanying drawings, in which.

Figures 1, 2:
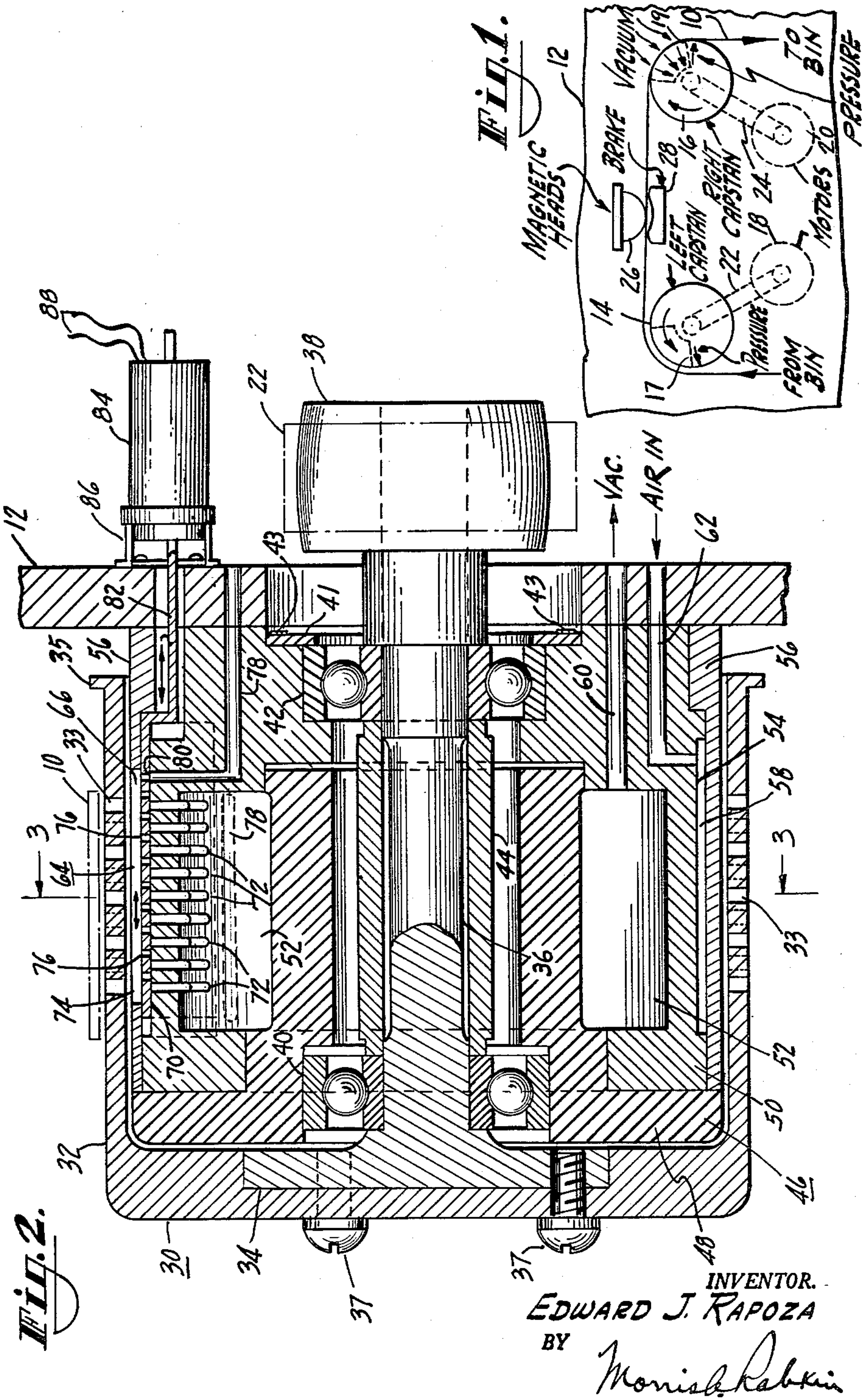
FIGURE 1 is a diagram which schematically illustrates a tape drive system in accordance with the invention.
FIGURE 2 is a sectional view, taken along the line 2—2 of FIG. 3, showing the details of construction of a tape drive capstan in accordance with the invention.

Referring more particularly to FIG. 1 of the drawings, there is shown a portion of a magnetic tape station. A magnetic tape 10 is arranged to be driven in opposite directions between a pair of reels (not shown) along a path defined by a left capstan 14, a multi-channel magnetic head 26, a brake 28, and a right capstan 16. Left and right tape accumulating bins are provided, respectively, between the left capstan and one of the reels and the right capstan and the other of the reels. The tape accumulating bins may be of the type which are described in United States Patent No. 2,730,309, issued January 10, 1956, to John S. Baer and entitled "Reeling System," or in United States Patent No. 2,838,250, issued to Alexander Stavrakis and Charles J. Kennedy on June 10, 1958, and entitled "Web Drive Mechanisms."

The reels, the bins and other elements shown in FIG. 1 are mounted on a panel 12. The capstans 14 and 16 are adapted to engage the back or base side of the tape. The opposite side of the tape, which has a coating of magnetizable material thereon, is engageable only by the multi-channel magnetic head 26. The brake 28 cooperates with the head 26 and performs two functions which are: (1) to gently bias the tape into engagement with the magnetic head 26 during normal transducing operations, and (2) to stop or brake the tape. The brake 28 may be similar to the brake disclosed in U.S. Patent No. 2,864,621, issued December 16, 1958, to Alexander Stavrakis and Charles J. Kennedy. The brake 28 may otherwise be a pneumatic device having a plurality of arrays of orifices. Pressurized air is forced through one of these arrays of orifices to bias the tape into engagement with the head during normal signal transducing operations for reading from and writing on the tape. Other of the arrays of the orifices are selectively coupled to a source of vacuum so that the tape may be drawn by suction into braking engagement with the brake.

The left capstan 14 and the right capstan 16 are pneumatic tape drive devices which are constructed in accordance with the features of the present invention and which will be disclosed in greater detail hereinafter. Each of the capstans has a cylindrical tape engaging surface which is rotatable. A motor 18 is coupled by means of a drive belt 22 to the left capstan. A similar motor 20 is coupled by means of a drive belt 24 to the right capstan. The motors 18 and 20 and their associated drive belts 22 and 24 may be mounted on the rear of the panel 12, while the capstans 14 and 16, the magnetic heads 26 and the brake 28 are mounted on the front of the panel 12. The capstans 14 and 16 may be rotated by a single motor and drive system, as may be provided in accordance with known drive techniques.

In the course of normal tape station operation, the tape 10 is repeatedly stopped, started and reversed in its direction of travel. Since reading and writing on the tape is possible only when the tape is traveling at its prescribed operating speed, the time required for the tape to be accelerated to the operating speed from rest is an important factor in determining the effective rate of information transfer between the magnetic tape station and its associated computer. Tape drive in opposite directions is accomplished by means of the left capstan 14 and the right capstan 16. These capstans are counter-rotating. Their peripheral speeds are equal to the prescribed tape speed. The right capstan 16 rotates in a clockwise direction and is effective to drive the tape from left to right as viewed in FIG. 1. The left capstan 14 rotates in a counter-clockwise direction and is operative to drive the tape from right to left as viewed in FIG. 1. When one of the capstans 14 and 16 is in driving relationship with the tape, the other is conditioned so as not to interfere with tape driving operations. When the tape is to be stopped, both capstans 14 and 16 may be conditioned so as not to interfere with braking operations. To this end, the capstans are provided with means for selectively developing a vacuum in a vacuum sector defined by the dashed lines 17 and 19 in FIG. 1, at their tape driving surfaces. The tape moves in response to this vacuum into driving engagement with the capstan 14 or 16 at which the vacuum is developed.

In FIG. 1, the tape station is shown conditioned for driving the tape from left to right. The right capstan 16 is operated to provide a vacuum in its vacuum sector 19, indicated diagrammatically in the drawing by the arrows pointing radially inwardly toward the axis of the capstan 16. The tape is drawn into driving contact with the peripheral surface of the right capstan 16 in the vacuum sector 19, so that the capstan 16 is operative to drive the tape from left to right into the tape accumulating bin (not shown) located at the lower right in FIG. 1. The right capstan 16 also includes means for applying jets of pressurized air radially outwardly along a line just past the vacuum sector of its peripheral surface. The jets of air aid in stripping the tape from the right capstan 16 as the tape leaves that capstan so that it will not cling to the capstan. The tape moves off the capstan tangentially with respect to the capstan surface and thence into the bin.

The left capstan 14 is continuously rotating while the vacuum is effective at the right capstan 16. However, the pneumatic means associated with the left capstan is operated to prevent the formation of a vacuum at the peripheral surface of the left capstan 14. Since the left capstan rotates at high speed, a boundary layer of air is formed hydrodynamically at its peripheral surface. This boundary layer of air is effective to separate the tape from the left capstan 14 so that the tape floats on the boundary layer of air. The left capstan therefore does not interfere with the tape drive provided by the right capstan 16. An arcuate portion of the tape path generally parallels a portion of the peripheral surface of the left capstan, including the vacuum sector 17 thereof. Means are provided in the left capstan 14 for providing jets of pressurized air flowing radially outwardly along a line just past the vacuum sector 17, as is the case with the right capstan 16.

When the brake 28 is operated to stop tape travel, the pneumatic means which are associated with the left capstan 14 and the right capstan 16 are both conditioned to prevent the formation of vacuum at the outer surfaces. A boundary layer of air is then formed at the peripheral surfaces of both capstans 14 and 16. The tape then floats on boundary layers of air at the left capstan 14 and at the right capstan 16. The capstans 14 and 16, therefore, do not interfere with braking operations, since they are both separated from the tape.

Figures 3, 4:
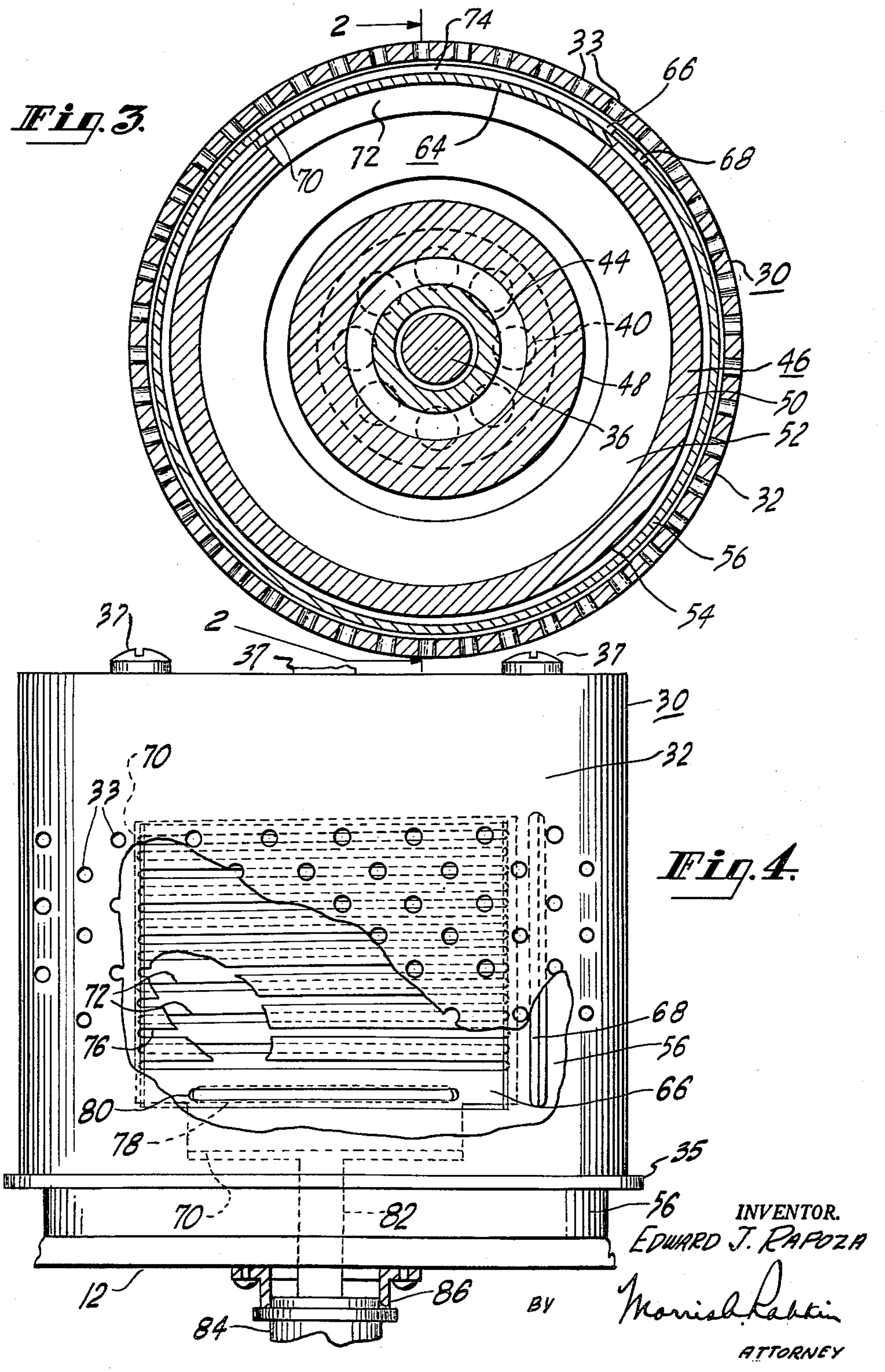
FIGURE 3 is a sectional view taken along the line 3—3 of FIG. 2 and viewed in the direction of the appended arrows.
FIGURE 4 is a plan view of the tape drive capstan shown in FIGS. 2 and 3.

Referring, now, to FIGS. 2 to 4 of the drawings, there is shown a pneumatic capstan which embodies the features of the present invention. This capstan may serve as the left capstan 14 shown in FIG. 1 of the drawings. The right capstan 16 is similar to the left capstan 14 and differs therefrom only in the position of the means for providing the jets of pressurized air for stripping the tape from the capstan. Accordingly, the construction of the right capstan 16 will be apparent from the following description of the left capstan 14:

The capstan 14 includes a cup-shaped, cylindrical, thin-walled, tape drive member or shell 30 having a cylindrical tape drive surface 32 which is adapted to engage the tape 10. The cylindrical walls of the cup-shaped member 30 are perforated by an array of apertures 33 which extend entirely around the member 30. Means are provided for selectively developing suction at the apertures 33 as they rotate through the vacuum sector of the capstan for the purpose of drawing the tape into engagement with the drive surface 32. These vacuum means will be described in detail hereinafter. The open end of the cup-shaped drive member 30 is rimmed by a flange 35 which extends radially outwardly from the drive surface 32. This flange affords structural rigidity to the thin-walled member 30.

Rotation of the tape drive member 30 is obtained by means of a drive shaft 36. This drive shaft is rotatably mounted to a core member 46 (hereinafter described in greater detail) of the pneumatic tape drive capstan. This core member 46 is a generally cylindrical body having an axial bore through which the shaft 36 extends. The core member 46 is fastened to the panel 12 by screws (not shown) which thereby also hold the entire capstan on the panel 12. These screws extend through the panel 12 into corresponding, threaded holes in the core member 46. A pair of ball bearings 40 and 42 support the shaft 36 on the core member 46. The outer races of these ball bearings 40 and 42 are secured by friction to the core members 46. The inner races of the ball bearings 40 and 42 are secured by friction fit to the shaft 36. The ball bearings 40 and 42 are spaced from each other along the shaft by a sleeve 44 which extends around the shaft 36 and is disposed in engagement with the inner races of the ball bearings 40 and 42. The inner races are wedged between the sleeve 44 and shoulders on the shaft 36. The shaft assembly including the ball bearings 40 and 42 is restrained against axial movement by a holding ring 41 which has an opening through which the shaft 36 extends. The holding ring 41 is secured near its outer edge to a part 50 of the core member 46 by means of screws 43.

The left hand end of the shaft 36 (FIG. 2) extends beyond the core member 46 and has a flange 34. This flange 34 fits into a circular recess in the closed end of the tape drive member 30. The tape drive member 30 is fastened to the shaft 36 by screws 37 which extend into the flange 34.

A pulley 38 is mounted on the right hand end of the shaft 36 which extends beyond the panel 12. The belt 22 is entrained around the pulley 38 and couples the pulley to the drive motor 20 (FIG. 1). The speed of the drive motor, which may be an electrical motor of the hysteresis type, is so related to the diameter of the pulley 38 and the diameter of the tape drive member 30 that the peripheral speed of the capstan 30 will be equal to the prescribed operating speed at which the tape is to be driven for reading therefrom and writing thereon. This speed may to 250 inches per second.

The core member 46 is formed by three parts an inner part 48, intermediate part 50 and an outer part 56. The inner and intermediate parts 48 and 50 are interlocking cylindrical members which are held together by an interference fit (i.e., the part 48 is cooled and the part 50 is heated before assembly, these parts being assembled while in their respective heated and cooled conditions and allowed to return to ambient temperature). The interlocking surfaces of the core part members 48 and 50 are recessed in part to form a torodial vacuum chamber 52. This chamber extends around the shaft 36 and is concentric therewith. The outer core part 56 is a sleeve which is snugly fit over the intermediate core part 50. The intermediate core part 50 has a recess 54 in its outer surface. This recess 54 and the sleeve 56 form another torodial chamber 58 which is concentric with the torodial vacuum chamber 52. A passage 60 extends through the panel 12 and the core member part 50 in a direction longitudinally of the core member. This passage 60 may have a fitting (not shown) at the end thereof which extends through the panel 12. This fitting may be connected through a pipe to a source of vacuum (not shown) which evacuates the chamber 52 through the passage 60. Another passage 62 extends longitudinally through the panel 12 and the intermediate core member part 50 and then radially into the chamber 58. Another fitting (not shown) may be connected to the end of the passage 62 at the panel 12. A pipe may be connected between this fitting and a source of pressurized air. The pressurized air in the chamber 58 and the vacuum (sub-atmospheric) pressure in the inner chamber 52 are communicated to the tape through the apertures 33 in the tape drive member 30 by way of an arrangement of openings, and valve means in the core member 46 about to be described.

This arrangement of valve means and openings in the core member 46 is found in a vacuum sector 64 of the core member 46 which asector extends along approximately ninety degrees of arc on the outer peripheral surface of the core member 46. This sector 64 will be best observed in FIGS. 3 and 4 of the drawings. The outer part or sleeve 56 has a rectangularly shaped window 66. The sleeve 56 has also a slot 68 therein which extends longitudinally along the sleeve 56 and parallels the edge of the window 66, as is best seen in FIG. 4. The window 66 in the sleeve 56 defines the limits in width and angular subtention of the vacuum sector 64. Just beneath the window 66 and above an array of parallel, circumferential through-slots 72 in the intermediate core part 50, lies a portion of the chamber 58. This portion contains a valve plate 70. The valve plate 70 has slots 76 and is desirably made of a light material, such as aluminum, whereas the sleeve 56 and the various parts of the core member 46 are made from a different metal, such as Phosphor bronze. The core member intermediate part 50 provides a slide bearing surface for the valve plate 70. The dissimilarities between the metals, from which the valve plate 70 and the core member part 50 are made, facilitate sliding motion of the plate 70 over the core member part 50.

The chamber 58 communicates with the apertures 33 in the tape drive member 30 by way of the slot 68. It will be recalled that a source of pressurized air is connected to the chamber 58. Pressurized air will therefore flow into the chamber 58 and out through the slot 68 and each longitudinal row of the apertures 33 as each row of apertures passes by the slot 68. This results in a continual flow of air for stripping the tape from the drive surface 32 of the capstan along a line just after the vacuum sector, as was explained in connection with FIG. 1 of the drawings.

The slots 72 underlie the valve plate 70 and communicate the chamber 52 through the slots 76 in the valve plate 70 with another chamber 74 defined by the window 66, the outer surface of the valve plate 70 and the inner surface of the tape drive member 30. The vacuum chambers 52 and 74 can be considered a single chamber divided into two parts by the valve plate 70. The slots 76 have the same spacing as the slots 72 in the core member part 50. The slots 76 are shown sealed by the core member intermediate part 50. Communication between the chamber 74 in the vacuum sector 64 and the atmosphere is also provided by a vent passage 78. This vent passage 78 extends from the chamber 74, first radially through the valve plate 70 via a slot 80 therein, then longitudinally through the core member intermediate part 50, and finally through the panel 12 to the atmosphere. The vent passage 78 cooperates with the slot 80, which controls communication between the vent 78 and the chamber 74.

The valve plate 70 is connected by way of a valve stem 82 to the armature of a solenoid 84. This solenoid may include a loudspeaker type field structure and voice coil of the type shown in U.S. Patent No. 2,750,961, issued June 19, 1956 to Joseph M. Uritis for "Valve Actuating Mechanism." The solenoid 84 is attached to the panel 12 by means of a bracket 86. Command signals for operating the pneumatic capstan are applied to the leads 88 to actuate the solenoid 84. The leads 88 for the application of these signals extend from the solenoid 84. The command signals may take the form of positive and negative pulses which energize the solenoid to move the stem 82 in or out, respectively.

The valve plate 70 is shown in FIGS. 2 and 4 in a position to prevent tape drive by the capstan, which corresponds to the condition of the left capstan 14, as shown in FIG. 1. The slots 76 in the valve plate 70 are out of alignment with their corresponding slots 72 in the core member part 50. The vacuum chamber 52 is isolated from the chamber 74 by the valve plate 70, which seals the slots 72, and, therefore, from the drive surface 32 of the capstan. The slot 80 in the valve plate, which cooperates with the vent passage 78, is, however, in alignment with the vent passage 78. Accordingly, the air pressure in the chamber 74 will be substantially equal to atmospheric pressure. Any leakage of vacuum through the valve plate 70 causes a flow of air through the vent passage 78 which stabilizes the pressure in the chamber 74 and tends to return the air pressure in the chamber 74 to atmospheric pressure.

On application of an appropriate command signal to the leads 88, the solenoid 84 will shift the valve plate 70 towards the left (FIG. 2) and bring the slots 76 in the valve plate in alignment with slots 72. The chamber 74 is much smaller in volume than the vacuum chamber 52, as is apparent from the drawings. Accordingly, the chamber 74 will be almost instantaneously exhausted to subatmospheric pressure. Suction will be created at the apertures 33 of the tape drive member 30 as it passes over the vacuum sector 64 of the core member 46. The tape 10 will, therefore, be drawn into engagement with the drive surface 32 of the capstan and will be accelerated rapidly to the peripheral speed of the member 30. Since the volume of air in the chamber 74, which must be exhausted to provide suction at the tape drive surface, is very small as compared to the volume of air in the vacuum chamber 52, the time delay due to the inertia of the volume of air in the chamber 74 for suction to be developed at the drive surface of the capstan 72 is very minute. The location of the valve plate 70, in accordance with a feature of the invention, immediately adjacent the drive surface of the capstan 32, so as to define a minute volume of air which is exhausted before tape drive can be effected, makes extremely fast tape accelerations possible with the capstan 14. The vacuum chamber 52 also provides for smoother operation of the pneumatic capstan. The chamber 52 is always evacuated during tape station operation and acts as a reservoir in reducing variations in the vacuum pressure which might be caused by a pulsating vacuum source, such as a reciprocating pump.

From the foregoing description, it will be apparent that there has been provided an improved pneumatic tape drive device and an improved system for driving or otherwise controlling the movement of a tape. Features of the invention which provide the rapid acceleration of the tape are equally applicable to provide rapid acceleration or control of the movement of other objects, such as web media, sheet material, films and the like which can be influenced by a vacuum. Although the invention has been described above in connection with a capstan for driving a magnetic tape record and in connection with a magnetic tape transport apparatus, other applications of the invention, as well as variations in the parts of the above-described capstan, will be apparent to those skilled in the art. Accordingly, the foregoing should be taken as illustrative and not in any limiting sense.

What is claimed is:

1. A tape drive capstan which comprises a rotatable shell having a tape engaging outer surface and an inner surface, a stationary member disposed within said shell having an outer surface opposed to said shell inner surface, said stationary member having a vacuum chamber therein and an opening which communicates said vacuum chamber with the outer surface thereof, said shell having a plurality of apertures therein extending between said outer and inner surfaces thereof for communication with said vacuum chamber, and a valve plate having an opening corresponding to said stationary member opening, said plate being interposed between said shell inner surface and said stationary member outer surface and being movable to control communication between said shell apertures and said vacuum chamber.

2. A vacuum capstan for controlling the movement of a tape which comprises a rotatable shell having a cylindrical outer surface for engaging said tape and an inner surface concentric with said outer surface, a shaft secured to said shell for rotating said shell, a stationary core member disposed around said shaft and having an outer surface concentric with said shell inner surface and spaced closely adjacent thereto, said core member having a vacuum chamber therein and also having a plurality of openings between said vacuum chamber and said core member outer surface, said shell having a plurality of apertures therein extending between said tape engaging outer surface and said inner surface thereof, said shell apertures and said core member openings being in alignment with each other, and a valve plate movable over said core member openings having a plurality of openings therein each corresponding to a different one of said core member openings, and means for moving said valve plate for bringing said valve plate openings into and out of communication with said core member openings.

3. Apparatus for feeding a tape which comprises a rotatable tape drive member having a cylindrical tape engaging surface, a stationary core member surrounded by said tape drive member and having a vacuum chamber therein, said core member having a plurality of slots therein extending into said chamber, all of said slots being located in a certain section of said core member, the periphery of said core member section being spaced from said rotatable member to define another chamber therebetween, said other chamber being much smaller in volume than said vacuum chamber, and a movable valve plate in said other chamber covering said slots, said valve plate having a plurality of openings therein and being movable to bring said openings thereof into and out of alignment with said slots for controlling communication between said vacuum chamber and said other chamber, said rotatable member having a plurality of apertures therethrough extending inwardly through said tape engaging surface, said apertures being arranged in an array peripherally around said rotatable member and over said sections so that some of said apertures provide communication between said other chamber and said tape engaging surface as said rotatable member rotates.

4. Apparatus for feeding a tape which comprises a rotatable tape drive member having a cylindrical tape engaging surface, a stationary core member surrounded by said tape drive member and having a vacuum chamber therein, said core member having a plurality of slots therein extending into said chamber, all of said slots being located in a certain section of said core member, the periphery of said core member section being spaced from said rotatable member to define another chamber therebetween, and a movable valve plate in said other chamber covering said slots, said valve plate having a plurality of openings therein and being movable to bring said openings thereof into and out of alignment with said slots for controlling communication between said vacuum chamber and said other chamber, said rotatable member having a plurality of apertures extending inwardly through said tape engaging surface, said apertures being arranged in an array peripherally around said rotatable member and over said section so that some of said apertures provide communication between said other chamber and said tape engaging surface as said rotatable member rotates, said core member having an opening therein extending from the periphery of said section to the ambient for venting said other chamber to the atmosphere, said valve plate covering said venting opening and having another opening arranged with respect to the aforementioned valve plate openings to open said venting opening when said valve plate closes said core member slots and vice-versa.

5. A tape drive capstan which comprises a hollow, rotatable, cylindrical member having a peripheral cylindrical surface engageable with said tape and an inner cylindrical surface, said member having an array of perforations extending circumferentially thereabout, each of said perforations extending between said surfaces, a stationary, cylindrical core member within said rotatable member having an outer surface spaced from said rotatable member inner surface and concentric therewith, said core member having a recess extending around said outer surface thereof, a sleeve around said core member outer surface bridging said recess and defining a chamber bounded by said sleeve and said core member outer surface, said sleeve having a first opening covering a segmental section thereof and a second opening smaller than said first opening and adjacent to said first opening, first and second means in said chamber on opposite sides of said first opening for confining a section of said chamber under said segmental section of said sleeve, said first means extending axially of said core member between said first and said second openings, vacuum supply means communicating through said core member with said confined section of said chamber, air pressure supply means communicating through said core member to portions of said chamber other than said confined section thereof, and valve means movable within said confined section of said chamber for controlling communication between said vacuum supply means and said confined section of said chamber.

References Cited in the file of this patent

UNITED STATES PATENTS

| | | |
|---|---|---|
| 2,778,634 | Gams et al. | Jan. 22, 1957 |
| 2,786,673 | Bridenstine | Mar. 26, 1957 |
| 2,954,911 | Baumeister et al. | Oct. 4, 1960 |
| 2,967,674 | Lawrance et al. | Jan. 10, 1961 |
| 3,036,304 | Willard | May 22, 1962 |
| 3,037,557 | Faeber et al. | June 5, 1962 |
| 3,082,925 | MacNeill et al. | Mar. 26, 1963 |

FOREIGN PATENTS

| | | |
|---|---|---|
| 828,257 | Great Britain | Feb. 17, 1960 |

OTHER REFERENCES

Franklin Factors Influencing the Application of Magnetic Tape Recording to Digital Computers: by D. P. Franklin in The Journal of the British Institution of Radio Engineers; January 1960, vol. 20, pages 9 to 21.

UNITED STATES PATENT OFFICE
CERTIFICATE OF CORRECTION

Patent No. 3,118,582 January 21, 1964

Edward J. Rapoza

It is hereby certified that error appears in the above numbered patent requiring correction and that the said Letters Patent should read as corrected below.

Column 5, line 57, for "to" read -- be --; column 6, line 20, for "asector" read -- sector --; line 37, for "Phosphor" read -- phosphor --.

Signed and sealed this 11th day of August 1964.

(SEAL)
ttest:

:RNEST W. SWIDER
ttesting Officer

EDWARD J. BRENNER
Commissioner of Patents